United States Patent
Chen

(10) Patent No.: US 7,584,309 B2
(45) Date of Patent: Sep. 1, 2009

(54) KEYBOARD VIDEO MOUSE SWITCH FOR MULTIPLE CHAINING AND A METHOD FOR SWITCHING ELECTRICAL SIGNALS THEREOF

(75) Inventor: Sun-Chung Chen, Taipei Hsien (TW)

(73) Assignee: Aten International Co., Ltd., Taipei Hsien (TW)

( * ) Notice: Subject to any disclaimer, the term of this patent is extended or adjusted under 35 U.S.C. 154(b) by 821 days.

(21) Appl. No.: 11/033,534

(22) Filed: Jan. 12, 2005

(65) Prior Publication Data

US 2005/0207338 A1  Sep. 22, 2005

(30) Foreign Application Priority Data

Mar. 22, 2004 (TW) .............................. 93107683 A

(51) Int. Cl.
*G06F 3/00* (2006.01)
*G06F 5/00* (2006.01)
*G06F 13/12* (2006.01)
*G06F 13/38* (2006.01)
*G06F 15/16* (2006.01)
*G06F 15/173* (2006.01)
*H04L 12/28* (2006.01)
*H04L 12/56* (2006.01)

(52) U.S. Cl. ............................. 710/38; 710/20; 710/62; 370/401; 709/229; 709/238

(58) Field of Classification Search ................... 710/62, 710/20, 38; 370/401; 709/229, 238
See application file for complete search history.

(56) References Cited

U.S. PATENT DOCUMENTS

| 4,800,484 | A | 1/1989 | Baize et al. |
| 4,807,184 | A | 2/1989 | Shelor |
| 7,003,563 | B2 | 2/2006 | Leigh et al. |
| 2002/0143996 | A1* | 10/2002 | Odryna et al. ............... 709/246 |
| 2003/0088655 | A1 | 5/2003 | Leigh et al. |
| 2003/0088665 | A1 | 5/2003 | Sauermann |
| 2003/0131127 | A1 | 7/2003 | King et al. |
| 2003/0227929 | A1 | 12/2003 | Ambrose |

FOREIGN PATENT DOCUMENTS

| EP | 0 493 934 | 7/1992 |
| EP | 0 721 164 | 7/1996 |
| JP | 2000-358046 A | 12/2000 |
| JP | 2003-163673 | 6/2003 |

OTHER PUBLICATIONS

"Detection of connection status for devices in a daisy chain" Research Disclosure, No. 445, May 1, 2001, p. 831, XP002356310. Havant, UK, Article No. 445124.

* cited by examiner

*Primary Examiner*—Alford W Kindred
*Assistant Examiner*—Farley J Abad

(57) ABSTRACT

A local electrical signal and a remote electrical signal are received for switching. When destinations of the local and remote electrical signals are the same local signal input device, only one of them is allowed to be transmitted to the destined local signal input device. When destinations of the local and remote electrical signals are at least one remote signal input device, only one of them is allowed to be transmitted to the destined remote signal input device.

20 Claims, 3 Drawing Sheets

KEYBOARD VIDEO MOUSE SWITCH FOR MULTIPLE CHAINING AND A METHOD FOR SWITCHING ELECTRICAL SIGNALS THEREOF

RELATED APPLICATIONS

The present application is based on, and claims priority from, Taiwan Application Serial Number 93107683, filed on Mar. 22, 2004, the disclosure of which is hereby incorporated by reference herein in its entirety.

BACKGROUND

1. Field of Invention

The present invention relates to a computer switching device. More particularly, the present invention relates to a KVM switch and a method for multiple chaining and providing high quality transmissions of analog signals.

2. Description of Related Art

With the rapid development of information technology, computers and their peripherals have become very popular. Computer users often use mice and keyboards to control their computers. Through the use of monitors or speakers, computer users can monitor the state of their computers. Sometimes a user may have more than one computer to process different types of data. Traditionally, each computer is equipped with one set of input/output (IO) peripheral devices, including the keyboard, mouse, monitor, and speakers. However, this is a waste of money and space if one has several computers.

In contrast, large business or enterprise internal networks often involve tens to thousands of servers. Each server needs a monitor, a keyboard, and a mouse for management. In practice, one rarely needs to manipulate these devices. Most of the time, the servers do not need to be controlled by the manager. In this situation, it is costly and a waste of space to have a set of IO peripheral devices for each server.

Therefore, a keyboard video mouse (KVM) switch is proposed to use at least one set of operation devices to manage several computers. Using the KVM switch does not only solve the cost problem, it simultaneously solves the problems of equipment and space. It may also conquer the compatibility problem among different interfaces.

However, the quantities of computers and sets of operating devices, which are available to be connected to the KVM switch, are restricted by the limitations of hardware design and cost of the KVM switch. Moreover, the conventional KVM switches are difficult to connect to one another, and when multiple sets of operating devices manage multiple computers at the same time, the analog signals transmitted therebetween, such as video signals, do not easily achieve their connections and switches in the system.

The foregoing two disadvantages inconvenience users in practical use. Prior art cannot provide a high-quality transmission for analog signals between multiple sets of operating devices and multiple computers and also cannot achieve the connections and switches in parallel of the analog signals. Especially for large-scale system providers or middle and small-scale internal networks, if the KVM switches cannot simultaneously handle the computers and the sets of operating devices in great quantities, the costs of system settings and maintenance are raised, and the transmission performance of the whole system is reduced.

SUMMARY

It is therefore an objective of the present invention to provide a keyboard video mouse (KVM) switch for chaining multiple KVM switches to expand the ability to connect more computers and input/output devices and for providing a high-quality transmission of analog signals.

It is another objective of the present invention to provide a method for switching electrical signals which transits a great amount of analog signals at high speed and performs parallel connections and switches between different analog signals.

In accordance with the foregoing and other objectives of the present invention, a KVM switch is provided for a plurality of signal output devices sharing a plurality of signal input devices by a plurality of KVM switches. The KVM switch comprises a chain switching array and a local switching array. The chain switching array has a plurality of chain input ports, a plurality of first chain output ports and a plurality of second chain output ports. The chain input ports are connected to other second chain output ports of another first KVM switch. The first chain output ports are connected to the signal input devices. The second chain output ports are connected to other chain input ports of another second KVM switch.

The local switching array has a plurality of local input ports, a plurality of first local output ports and a plurality of second local output ports. The local input ports are connected to the signal output devices. The first local output ports are connected to the signal input devices. The second local output ports are connected to other chain input ports of the second KVM switch.

When destinations of the first chain output port and the first local output port are the same, the first chain output port and the first local output port are not allowed to transmit simultaneously. When destinations of the second chain output port and the second local output port are the same, the second chain output port and the second local output port are not allowed to transmit simultaneously.

In another aspect, the present invention provides a method for switching electrical signals, in which a local electrical signal and a remote electrical signal are received. When destinations of the local electrical signal and the remote electrical signal are the same local signal input device, only one of the local electrical signal and the remote electrical signal is allowed to be transmitted to the destined local signal input device. When the destinations of the local electrical signal and the remote electrical signal are at least one remote signal input device, only one of the local electrical signal and the remote electrical signal is allowed to be transmitted to the destined remote signal input device.

According to one preferred embodiment of the present invention, the local electrical signal and the remote electrical signal are analog signals. The chain switching array is a crosspoint chip, and the local switching array is a crosspoint chip. The first chain output ports and the first local output ports are connected in parallel and in a one-to-one relationship. The second chain output ports and the second local output ports are connected in parallel and in a one-to-one relationship.

A quantity of the chain input ports is equal to a quantity of the second chain output ports of the first KVM switch, and the chain input ports are connected to the second chain output ports of the first KVM switch in a one-to-one relationship. A quantity of the second chain output ports is equal to a quantity of the chain input ports of the second KVM switch, and the second chain output ports are connected to the chain input ports of the second KVM switch in a one-to-one relationship.

In the preferred embodiment, the signal output devices are computers, and the signal input devices are displays. In other preferred embodiments of the present invention, the signal output devices can be cameras, and the signal input devices can be computers.

According to another preferred embodiment of the present invention, the KVM switch further comprises an ID auto-setting circuit. The ID auto-setting circuit is arranged to set an ID for the KVM switch. A first ID of the first KVM switch is set to one less than the ID of the KVM switch, and a second ID of the second KVM switch is set to one more than the ID of the KVM switch.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
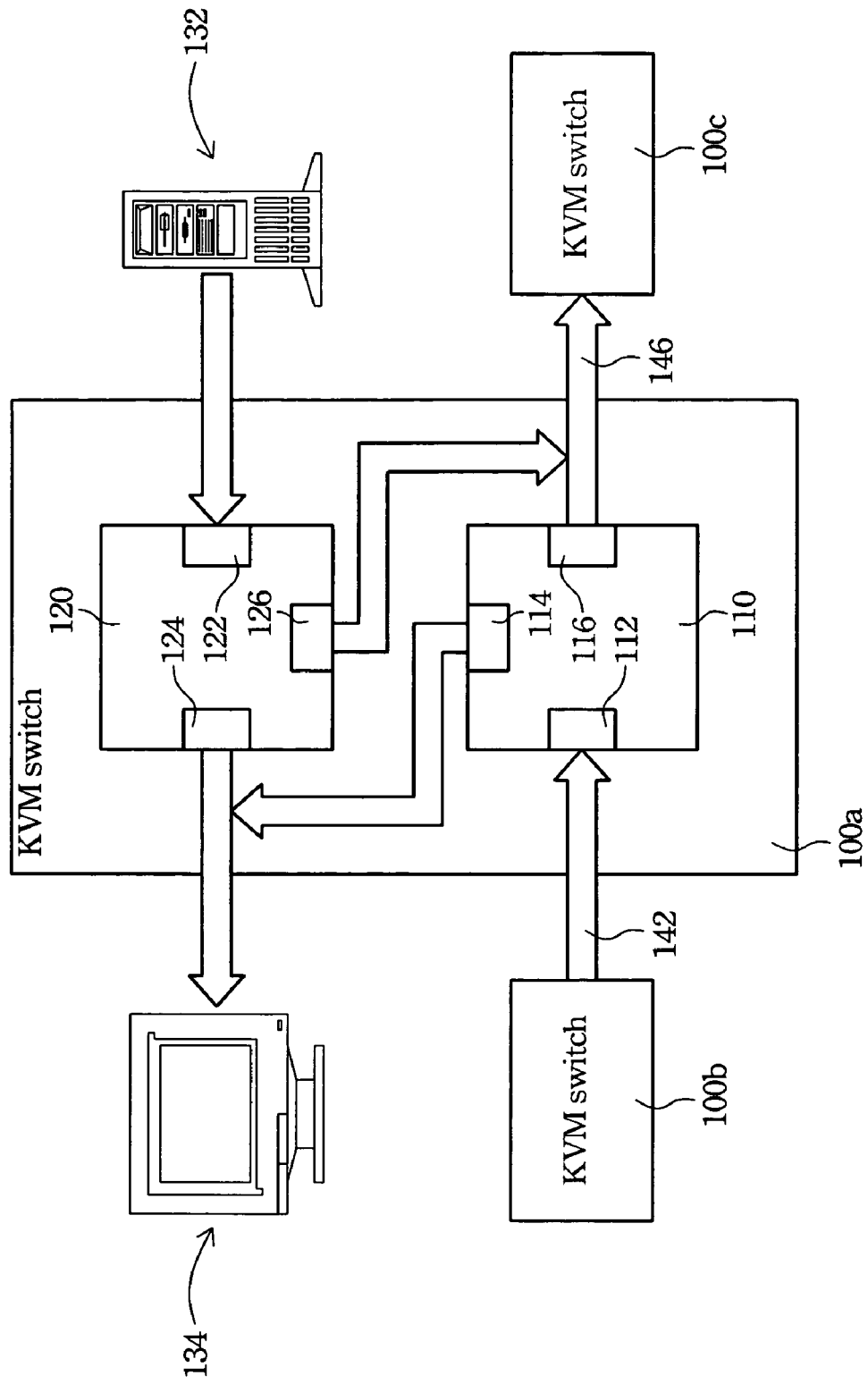
FIG. 1 illustrates a schematic view of one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic view of one preferred embodiment of the present invention. A plurality of signal output devices 132, such as computers, share a plurality of signal input devices 134, such as displays, by a plurality of KVM switches 100a, 100b and 100c, which are connected in a chain. In order to clearly interpret this preferred embodiment, only one KVM switch 100a is illustrated in detail, and one signal output device 132 and one signal input device 134 are used to represent multiple ones in FIG. 1.

The KVM switch 100a comprises a chain switching array 110 and a local switching array 120. The chain switching array 110 has a plurality of chain input ports 112, a plurality of first chain output ports 114, and a plurality of second chain output ports 116. The chain input ports 112 are connected to other second chain output ports of a KVM switch 110b. The first chain output ports 114 are connected to the signal input devices 134. The second chain output ports 116 are connected to other chain input ports of a KVM switch 100c.

The local switching array 120 has a plurality of local input ports 122, a plurality of first local output ports 124, and a plurality of second local output ports 126. The local input ports 122 are connected to the signal output devices 132. The first local output ports 124 are connected to the signal input devices 134. The second local output ports 126 are connected to other chain input ports of the KVM switch 100c.

In the preferred embodiment, the signal output devices 132 are thirty-two computers, the signal input devices 134 are four displays, and the electrical signals transmitted therebetween are analog video signals. The chain switching array 110 used in the preferred embodiment is a crosspoint chip having four input ports and eight output ports. The four input ports are connected to a bus 142 having four channels, and the bus is used to connect the other four chain switching output ports of the KVM switch 100b. The four output ports are provided for four displays, and the remaining four output ports are connected to another bus 146 having four channels. The bus 146 is used to connect four chain switching input ports of the KVM switch 100c.

The local switching array 120 used in the preferred embodiment is a crosspoint chip having thirty-two input ports and eight output ports. The thirty-two input ports are provided for thirty-two computers. The four output ports are provided for four displays, and the remaining four output ports are connected to the bus 146 having four channels. As mentioned above, the bus 146 is used to connect four chain switching input ports of the KVM switch 100c.

The crosspoint chip is a switching array providing multiple output ports and multiple input ports. Due to containing feedback circuits inside, the crosspoint chip provides internal compensation and amplification such that the output signal can keep the same state as when it is input and therefore is especially suitable for switching analog signals, such as video signals.

The quantity of the chain input ports 112 and the quantity of the second chain output ports of the KVM switch 100b are both four, and the chain input ports 112 are connected to the second chain output ports of the KVM switch 100b in a one-to-one relationship. The quantity of the second chain output ports 116 and the quantity of the chain input ports of the KVM switch 100c are both four, and the second chain output ports 116 are connected to the chain input ports of the KVM switch 100c in a one-to-one relationship. Moreover, the first chain output ports 114 and the first local output ports 124 are connected in parallel and in a one-to-one relationship. The second chain output ports 116 and the second local output ports 126 are connected in parallel and in a one-to-one relationship.

When destinations of the first chain output port 114 and the first local output port 124 are the same signal input device 134, the first chain output port 114 and the first local output port 124 are not allowed to transmit simultaneously. In other words, when the first chain output port 114 is switched on, the first local output port 124 connected in parallel to the first chain output port 114 is switched off, and therefore only the first chain output port 114 is allowed to transmit electrical signals to the signal input device 134. On the other hand, when the first local output port 124 is switched on, the first chain output port 114 connected in parallel to the first local output port 124 is switched off, and therefore only the first local output port 124 is allowed to transmit electrical signals to the signal input device 134.

Moreover, when destinations of the second chain output port 116 and the second local output port 126 are the same KVM switch 100c, the second chain output port 116 and the second local output port 126 are not allowed to transmit simultaneously. In other words, when the second chain output port 116 is switched on, the second local output port 126 connected in parallel to the second chain output port 116 is switched off, and therefore only the second chain output port 116 is allowed to transmit electrical signals to the KVM switch 100c. On the other hand, when the second local output port 126 is switched on, the second chain output port 116 connected in parallel to the second local output port 126 is switched off, and therefore only the second local output port 126 is allowed to transmit electrical signals to the KVM switch 100c.

According to the above descriptions, the KVM switch 100a receives a local electrical signal and a remote electrical signal. The local and remote electrical signals are both analog signals. When destinations of the local electrical signal and the remote electrical signal are the same signal input device 134, only one of the local electrical signal and the remote electrical signal is allowed to be transmitted to the signal input device 134. When the destinations of the local electrical signal and the remote electrical signal are at least one remote signal input device connected to the KVM switch 100c, only one of the local electrical signal and the remote electrical signal is allowed to be transmitted to the destined remote signal input device.

In the preferred embodiment, the signal output devices 132 are computers, and the signal input devices 134 are displays. In other preferred embodiments of the present invention, the signal output devices 132 can be cameras or other conventional signal output devices, and the signal input devices 134 can be computers or other conventional signal input devices.

According to another preferred embodiment of the present invention, the KVM switch further comprises an ID auto-setting circuit. The ID of the KVM switch is provided to determine whether it is a master KVM switch or a slave KVM switch, for facilitating sequential signal transmissions. Moreover, when multiple KVM switches are connected in a chain, every KVM switch needs its own ID to perform communications with others.

Figure 2:
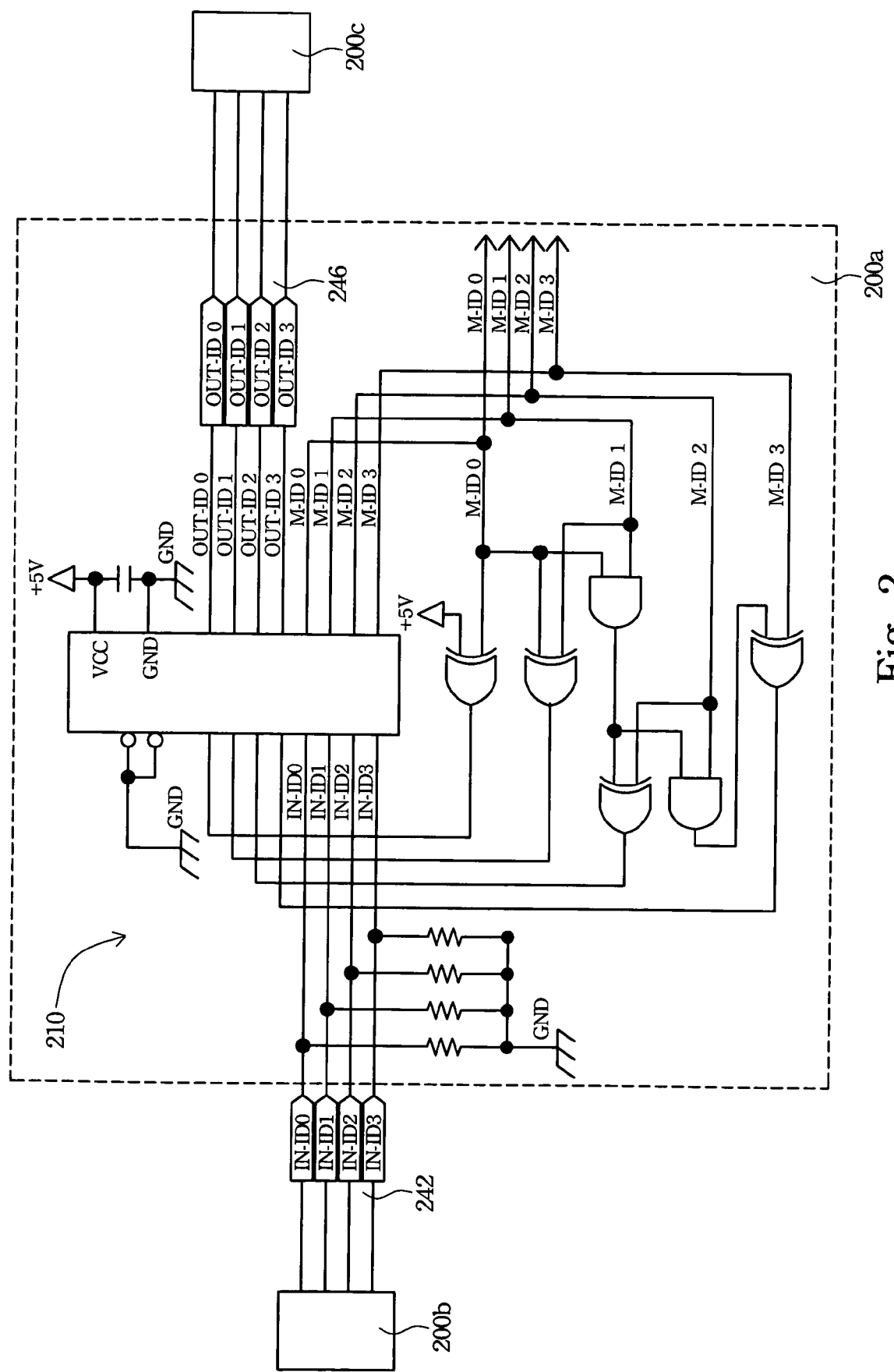
FIG. 2 illustrates a schematic view of an ID auto-setting circuit of another preferred embodiment of the present invention.

FIG. 2 illustrates a schematic view of an ID auto-setting circuit of another preferred embodiment of the present invention. An ID auto-setting circuit 210 is used to set an ID (M_ID) for a KVM switch 200a and automatically and easily sets an ID for every KVM switch according to the sequential relationship of the multiple KVM switches connected in a chain, to prevent the conventional complications caused by distributing IDs in communications.

As illustrated in FIG. 2, another KVM switch 200b is connected to chain input ports of the KVM switch 200a by a bus 242. An ID (IN_ID) of the KVM switch 200b, of which the sequence is earlier than that of the KVM switch 200a, is set to one less than the ID (M_ID) of the KVM switch 200a. Another KVM switch 200c is connected to second chain output ports of the KVM switch 200a by a bus 246. An ID (OUT_ID) of the KVM switch 200c, of which the sequence is later than that of the KVM switch 200a, is set to one more than the ID (M_ID) of the KVM switch 200a.

The foregoing embodiments perform the connections of analog signals between multiple KVM switches by a combination of two switching arrays. The output ports of chain and local switching arrays are connected, of which the destinations are the same or which use the same channel, and the switches of the output ports are controlled to achieve the output selections. The output ports of which the destinations are the same or which use the same channel are not switched on simultaneously in order to prevent two analog signals from being output to the same signal input device or occupying the same channel at the same time.

The preferred embodiment provides the high-quality transmission of analog signals, especially for video signals. Furthermore, under this architecture, the video signals can also be transmitted to several signal input devices. For example, different displays can be used to display the images of the same computer at the same time. In addition, by hardware configurations and the ID auto-setting circuit, the preferred embodiment also prevents the conventional complications caused by distributing IDs in communications.

Figure 3:
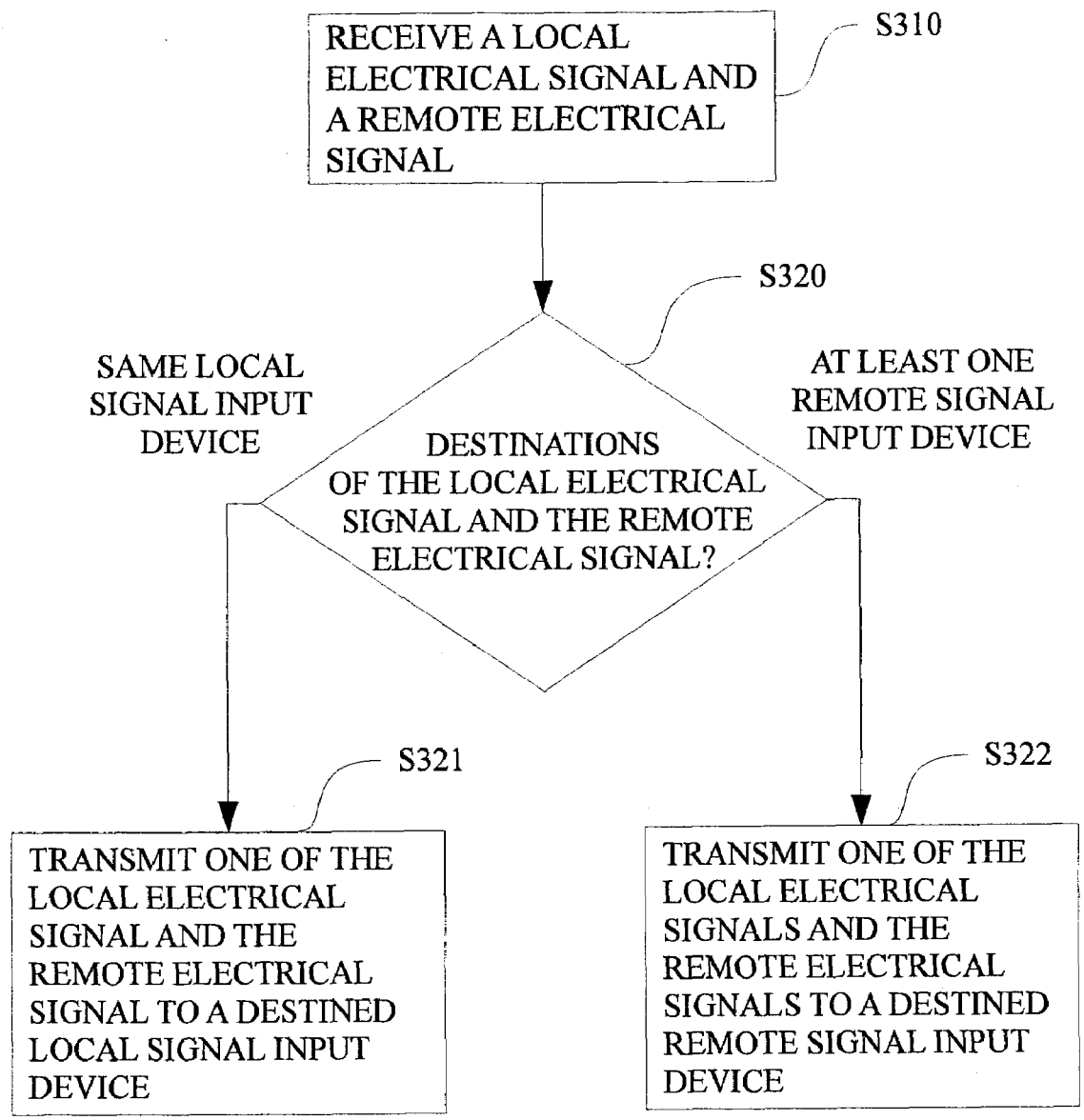
FIG. 3 is a flowchart showing a method for switching electrical signals according to an embodiment of the invention.

In addition, a method for switching electrical signals according to an embodiment of the invention is shown in FIG. 3 in a flowchart. In step S310, a local electrical signal and a remote electrical signal are received. In step S320, one of the local electrical signal and the remote electrical signal is transmitted selectively according to destinations of the local electrical signal and the remote electrical signal. As indicated in step S321, when the destinations of the local electrical signal and the remote electrical signal are the same local signal input device, only one of the local electrical signal and the remote electrical signal is transmitted to the destined local signal input device. When the destinations of the local electrical signal and the remote electrical signal are at least one remote signal input device, only one of the local electrical signal and the remote electrical signal is transmitted to the destined remote signal input device, as indicated in step S322.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A keyboard, video, mouse (KVM) switch, suitable for a plurality of signal output devices sharing a plurality of signal input devices by a plurality of KVM switches, the KVM switch comprising:

a chain switching array having a plurality of chain input ports, a plurality of first chain output ports and a plurality of second chain output ports, wherein the chain input ports are connected to other second chain output ports of another first KVM switch, the first chain output ports are connected to the signal input devices, and the second chain output ports are connected to other chain input ports of another second KVM switch; and a local switching array having a plurality of local input ports, a plurality of first local output ports and a plurality of second local output ports, wherein the local input ports are connected to the signal output devices, the first local output ports are connected to the signal input devices, and the second local output ports are connected to the other chain input ports of the second KVM switch;

wherein when destinations of the first chain output port and the first local output port are the same, the first chain output port and the first local output port are not allowed to transmit simultaneously, and when destinations of the second chain output port and the second local output port are the same, the second chain output port and the second local output port are not allowed to transmit simultaneously.

2. The KVM switch of claim 1, wherein the chain switching array is a crosspoint chip.

3. The KVM switch of claim 1, wherein the local switching array is a crosspoint chip.

4. The KVM switch of claim 1, wherein a quantity of the chain input ports is equal to a quantity of the second chain output ports of the first KVM switch, and the chain input ports are connected to the second chain output ports of the first KVM switch in a one-to-one relationship.

5. The KVM switch of claim 1, wherein a quantity of the second chain output ports is equal to a quantity of the chain input ports of the second KVM switch, and the second chain output ports are connected to the chain input ports of the second KVM switch in a one-to-one relationship.

6. The KVM switch of claim 1, wherein the first chain output ports and the first local output ports are connected in parallel and in a one-to-one relationship.

7. The KVM switch of claim 1, wherein the second chain output ports and the second local output ports are connected in parallel and in a one-to-one relationship.

8. The KVM switch of claim 1, further comprising: an ID auto-setting circuit arranged to set an ID for the KVM switch, wherein a first ID of the first KVM switch is set to one less than the ID of the KVM switch, and a second ID of the second KVM switch is set to one more than the ID of the KVM switch.

9. A method of switching electrical signals, suitable for a plurality of local and remote computers sharing a plurality of local and remote signal monitors, the method comprising the following steps performed by a KVM switch as defined in claim 1:
- receiving a local electrical signal and a remote electrical signal from local and remote computers, respectively;
- transmitting only one of the local electrical signal and the remote electrical signal to a destined local monitor when destinations of the local electrical signal and the remote electrical signal are the same local monitor; and
- transmitting only one of the local electrical signal and the remote electrical signal to a destined remote monitor when the destinations of the local electrical signal and the remote electrical signal are at least one remote monitor.

10. The method of claim 9, wherein the local electrical signal and the remote electrical signal are analog signals.

11. The method of claim 9, further comprising: connecting paths of the local electrical signal and the remote electrical signal to the destined local monitor in parallel.

12. The method of claim 9, further comprising: connecting paths of the local electrical signal and the remote electrical signal to the destined remote monitor in parallel.

13. The method of claim 9, wherein the method routes the local electrical signal by the local switching array.

14. The method of claim 13, wherein the local switching array is a crosspoint chip.

15. The method of claim 9, wherein the method routes the remote electrical signal by the chain switching array.

16. The method of claim 15, wherein the chain switching array is a crosspoint chip.

17. A method of switching electrical signals, suitable for a plurality of local and remote signal output devices sharing a plurality of local and remote signal input devices, the method comprising the following steps performed by a KVM switch as defined in claim 1:
- receiving a local electrical signal from a local signal output device and a remote electrical signal from a remote signal output device by the local switching array and the chain switching array, respectively;
- transmitting only one of the local electrical signal received by the local switching array and the remote electrical signal received by the chain switching array to a destined local signal input device through the local switching array when destinations of the local electrical signal and the remote electrical signal are the same local signal input device communicable through the local switching array; and
- transmitting only one of the local electrical signal received by the local switching array and the remote electrical signal received by the chain switching array to a destined remote signal input device through the chain switching array when the destinations of the local electrical signal and the remote electrical signal are at least one remote signal input device communicable through the chain switching array.

18. The method of claim 17, wherein the local switching array is a crosspoint chip.

19. The method of claim 17, wherein the chain switching array is a crosspoint chip.

20. The method of claim 17, wherein the local electrical signal and the remote electrical signal are analog signals.

* * * * *